May 19, 1931.                S. M. PHELPS                  1,806,118
                              BRICK METER
                Filed July 16, 1929           2 Sheets-Sheet 1
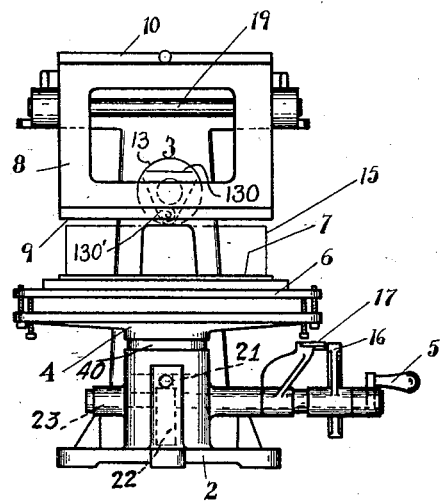
FIG. I
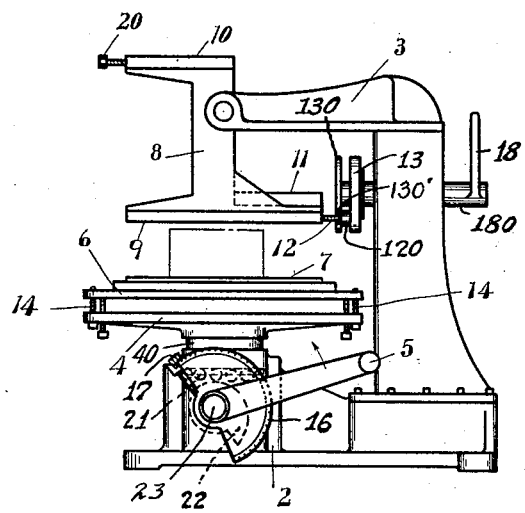
FIG. II
INVENTOR
Stuart M. Phelps.
by Christy, Christy and Wharton
his attorneys May 19, 1931.  S. M. PHELPS  1,806,118
BRICK METER
Filed July 16, 1929   2 Sheets-Sheet 2
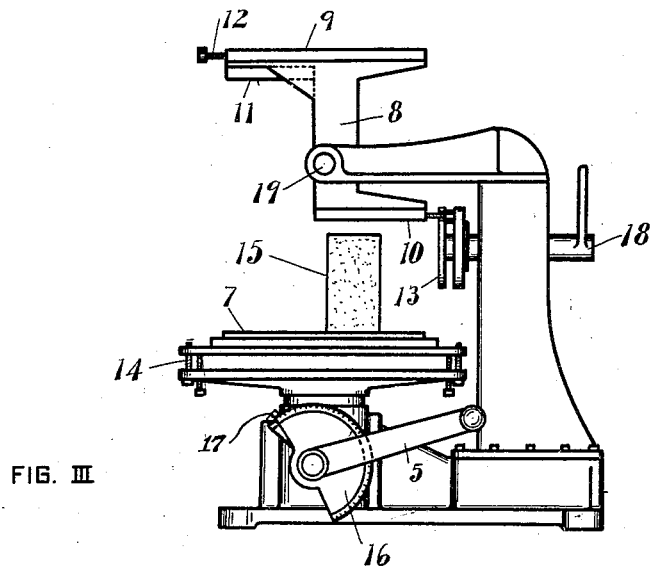
FIG. III
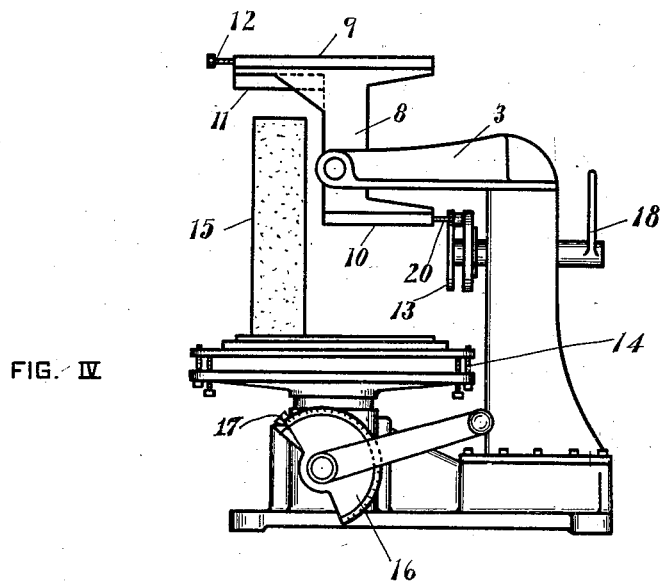
FIG. IV
INVENTOR
Stuart M. Phelps
by Christy, Christy and Wharton
his attorneys.

Patented May 19, 1931

1,806,118

UNITED STATES PATENT OFFICE

STUART M. PHELPS, OF PITTSBURGH, PENNSYLVANIA, ASSIGNOR TO AMERICAN REFRACTORIES INSTITUTE, A CORPORATION OF PENNSYLVANIA

BRICK METER

Application filed July 16, 1929. Serial No. 378,681.

This invention relates to a brick measuring device.

How to measure bricks has been a matter of much controversy, and the lack of agreement has been largely due to the fact that there have been no adequate means of measurement. The various customary means of measurement, such as rules and gauges, and the practice of stack measurements are subject to considerable errors. There are errors in the reading of rules, errors rise in consequence of measurement at particularly selected places in the extent of the brick. In stacking brick, inequalities and warpage are such that a given plurality of bricks cannot be piled twice to exactly the same height. These and other causes make it difficult for the manufacturer and consumer of brick to agree upon their size.

My invention resides in apparatus in the employment of which the sources of variation in measurement are largely eliminated. The apparatus furthermore is compact, easy of operation, and has the capacity of measuring easily and quickly all of the three dimensions of a brick. In the apparatus of my invention the brick is measured between parallel surfaces, and means are provided to vary with calibrated movement the distance between such surfaces.

In the accompanying drawings Figure I is a front elevation of the measuring machine of this invention; Figure II is a side elevation of the same; and Figs. III and IV are similar views, illustrating different positions of certain elements of the apparatus during measuring operations.

The reference numeral 2 designates the base of the machine, and 3 denotes a fixed standard borne thereon. Mounted in the base is an elevating table 4 having an organization of elements operable by handle 5 to raise and lower the same. The handle 5 is rigidly attached to a transversely extending shaft 23, and, as indicated in dotted lines in Figs. I and II, a cam 22 is secured to this shaft. Upon the bottom face of the table-supporting plunger 40 there is located a race 21 of ball bearings which rests on the cam 22 (Fig. II), thereby so supporting the table 4 that rotation of the handle 5 and cam 22 effects the raising or lowering of the table. I have not indicated in the drawings the retaining housing for the bearings 21. Retaining housings for ball bearings are well known in the art, and it is obvious that any suitable retaining housing may be secured to the bottom face of plunger 40, there to retain the balls 21, as indicated in Fig. II. The table 4 carries a minutely adjustable top 6 having the machined surface or platen 7.

Pivotally mounted in standard 3 is a member 8 having the three finished plane surfaces 9, 10 and 11 extending in parallelism. Adjustable screws 12 and 20 serve in conjunction with the locking elements 13 and 130 to retain member 8 in one and the other of its two alternate positions, illustrated, one of them in Figs. I and II, and the other in Figs. III and IV. In the position first indicated the surface 9 faces the surface of platen 7; in the alternate position, the two surfaces 10 and 11 face the surface of the platen. In both positions the opposed surfaces are parallel. The member 8 is so shaped and its surfaces so positioned with respect to the axis of turning that in the first of the positions indicated the surface 9 stands remote from the face of platen 7 at an interval approximating the thickness of a brick, and in the second position the surfaces 10 and 11 stand remote from the face of the platen at intervals approximating, respectively, the width and the length of a brick.

With the machine arranged as shown in Figs. I and II, a brick 15 (indicated by broken lines) may be placed on platen 7 extending in length and breadth in contact with the platen and extending in thickness toward the opposed surface 9. The handle 5 is then rotated counter-clockwise to raise table 4, and bring the brick against the surface 9. There moves with handle 5 an arcuate scale 16, which in conjunction with the fixed index 17, may indicate expeditiously the amount of deviation in thickness of the test brick from a fixed standard.

When the member or tumbler 8 is so positioned, that is, positioned for the measurement of the thickness of the specimen brick, the head 120 of screw 12 is locked between the facing surfaces of disk members 13 and 130. Both disk members are secured to shaft 180, and are rotatable with the shaft by means of a handle 18. Disk 130 is notched at 130' for the reception of the shank of screw 12 when the handle 18 is rotated to lock the screw head 120 between the disks 130, 13.

To measure the width and length of the brick, as indicated respectively in Figures III and IV, the handle 18 is moved to release the screw 12. Member 8 is then swung around its mounting shaft 19 to its alternate position, and the screw 20 is adjusted and locked into members 13 to bring the surfaces 10 and 11 into parallelism with the platen. Needless to say, after the screws 12, 14 and 20 are suitably adjusted to insure parallelism of the surfaces 7 and 9 in one position (Fig. II) of the tumber 8, and of the surfaces 7, 10 and 11 in the other position (Fig. III), they (the screws) may remain unaltered for a great many tests. Figure III shows the brick in position for a width test, and Figure IV shows it in position for a length test. In both of the latter tests the procedure is the same as that followed in testing the thickness of the specimen brick, as described above.

The present structure is the result of considerable study, since the requirements were not readily incorporated in a simple and practical machine, which could be quickly manipulated to determine the overall dimensions of a specimen.

I claim as my invention:

A three-dimension gauge comprising opposite jaws of which one is movable relatively to the second, the second jaw including a tumbler movable from one to the other of two alternate service positions, and presenting in one such service position a single face opposed to the first-mentioned jaw and presenting in the other service position two faces opposed to and spaced at unequal distances from the first-mentioned jaw.

In testimony whereof I have hereunto set my hand.

STUART M. PHELPS.